United States Patent
Pianu

(10) Patent No.: US 10,684,186 B2
(45) Date of Patent: Jun. 16, 2020

(54) KNOCK SENSOR WITH LOWER COLLAR BORED WITH ATTACHMENT HOLES

(71) Applicants: Continental Automotive France, Toulouse (FR); Continental Automotive GmbH, Hannover (DE)

(72) Inventor: Antoine Pianu, Pompignan (FR)

(73) Assignees: Continental Automotive France (FR); Continental Automotive GmbH (DE)

( * ) Notice: Subject to any disclaimer, the term of this patent is extended or adjusted under 35 U.S.C. 154(b) by 0 days.

(21) Appl. No.: 16/342,230

(22) PCT Filed: Nov. 28, 2017

(86) PCT No.: PCT/FR2017/053276
§ 371 (c)(1),
(2) Date: Apr. 16, 2019

(87) PCT Pub. No.: WO2018/100286
PCT Pub. Date: Jun. 7, 2018

(65) Prior Publication Data
US 2019/0323914 A1    Oct. 24, 2019

(30) Foreign Application Priority Data

Dec. 1, 2016 (FR) ...................... 16 61802

(51) Int. Cl.
*G01L 19/14* (2006.01)
*G01L 23/22* (2006.01)
*G01L 23/26* (2006.01)

(52) U.S. Cl.
CPC .......... *G01L 19/141* (2013.01); *G01L 23/222* (2013.01); *G01L 23/26* (2013.01)

(58) Field of Classification Search
None
See application file for complete search history.

(56) References Cited

U.S. PATENT DOCUMENTS

| 4,492,109 A | * | 1/1985 | Ozaki | G01L 23/222 73/35.12 |
| 4,944,179 A | * | 7/1990 | Komurasaki | G01H 11/08 310/329 |
| 4,964,294 A | * | 10/1990 | Kawajiri | G01L 23/222 310/329 |
| 5,872,307 A | * | 2/1999 | Brammer | G01L 23/222 73/35.11 |

(Continued)

FOREIGN PATENT DOCUMENTS

FR    2775525 A1    9/1999

OTHER PUBLICATIONS

English Translation of the Written Opinion for International Application No. PCT/FR2017/953276, dated Feb. 15, 2016—7 pages.

(Continued)

*Primary Examiner* — Paul M. West
*Assistant Examiner* — Mark A Shabman
(74) *Attorney, Agent, or Firm* — RatnerPrestia

(57) ABSTRACT

A knock sensor including a body, having a detection assembly able to measure vibrations, and a metal mount having a support ring on which the detection assembly rests, a peripheral casing to protect the detection assembly, made from a thermoplastic material applied by overmolding at least in part around the body. The mount includes a lower flange below the support ring and the lower flange is bored with attachment holes, which improve its sealing.

12 Claims, 4 Drawing Sheets

(56) References Cited

U.S. PATENT DOCUMENTS

| | | | | |
|---|---|---|---|---|
| 5,965,804 A * | 10/1999 | Sakamoto | G01L 23/222 | 73/35.11 |
| 6,655,352 B2 * | 12/2003 | Subramanian | G01L 23/222 | 123/406.4 |
| 7,178,383 B2 * | 2/2007 | Shibata | G01L 23/222 | 73/114.07 |
| 8,833,142 B2 * | 9/2014 | Aoi | G01L 23/222 | 73/35.11 |
| 10,094,727 B2 * | 10/2018 | Aoi | G01L 23/222 | |
| 2003/0200790 A1 * | 10/2003 | Harada | G01L 23/222 | 73/35.11 |
| 2004/0187559 A1 * | 9/2004 | Yokoi | G01H 1/00 | 73/35.01 |
| 2005/0022582 A1 * | 2/2005 | Barron | G01L 23/222 | 73/35.01 |
| 2005/0155412 A1 * | 7/2005 | Aoi | G01L 23/222 | 73/35.07 |
| 2005/0229678 A1 * | 10/2005 | Shibata | G01L 23/10 | 73/35.11 |
| 2005/0262925 A1 * | 12/2005 | Yokoi | G01L 23/222 | 73/35.12 |
| 2006/0207312 A1 * | 9/2006 | Kuno | G01H 11/08 | 73/35.11 |
| 2010/0005859 A1 * | 1/2010 | Ito | G01L 23/222 | 73/35.11 |
| 2014/0026360 A1 * | 1/2014 | Fleck | B25G 3/00 | 16/110.1 |
| 2014/0081553 A1 * | 3/2014 | Aoi | G01L 23/222 | 701/101 |
| 2014/0218678 A1 * | 8/2014 | Sheldon | G02C 13/001 | 351/178 |
| 2015/0204750 A1 * | 7/2015 | Aoi | G01L 23/222 | 73/35.11 |

OTHER PUBLICATIONS

International Search Report and Written Opinion for International Application No. PCT/FR2017/053276, dated Feb. 15, 2018—7 pages.

* cited by examiner

KNOCK SENSOR WITH LOWER COLLAR BORED WITH ATTACHMENT HOLES

CROSS REFERENCE TO RELATED APPLICATIONS

This application is the U.S. National Phase Application of PCT International Application No. PCT/FR2017/053276, filed Nov. 28, 2017, which claims priority to French Patent Application No. 1661802, filed Dec. 1, 2016, the contents of such applications being incorporated by reference herein.

FIELD OF THE INVENTION

The present invention relates to a knock sensor for a motor vehicle.

BACKGROUND OF THE INVENTION

In vehicles that run on gasoline, ignition of the fuel/oxidant mixture in each cylinder is commanded by a spark plug (in a diesel engine, the fuel/oxidant mixture self-ignites when it reaches a predefined self-ignition temperature) and has to occur at a suitable point in the cycle in order to obtain optimum efficiency in the combustion of the mixture. When ignition occurs too early, vibrations occur and may damage the engine. When ignition occurs too late, the efficiency of the cylinder decreases significantly. Optimum efficiency is obtained for ignition occurring in a predefined time window, in which vibrations are extremely low at the start of the window and near-zero at the end of the window. In these vehicles, self-ignition is to be avoided in order to guarantee that ignition occurs using the spark from the spark plug within the predefined time window. Ignition that occurs at an inopportune time in the cycle may also damage the cylinder or the piston by creating overpressure within the combustion chamber in the wrong part of the stroke.

Another phenomenon liable to damage cylinder and piston (in gasoline or diesel engines) is knock. Knock is disordered combustion, with the appearance of erratic zones in which one or several combustions begin spontaneously before coming into contact with the flame front, leading to pressure spikes and to the explosion resonating off the walls of the combustion chamber and of the piston. These pressure spikes are very damaging to the piston and the cylinder liners of the engine, and also to the cylinder head gasket and the spark plug.

In order to ignite the mixture in each cylinder during the optimum time window or to adjust the fuel/oxidant mixture in order to prevent or reduce knock, it is known practice to monitor the vibrations of each cylinder using one or more knock sensors Such a knock sensor conventionally comprises:
a body comprising:
  a metal mount notably having a central bore to accept a fixing screw so that the knock sensor can be fixed to the engine block (the torque applied to this fixing screw is of the order of 20 N.m) and a lower support ring to accept a detection assembly,
  said detection assembly, which usually comprises a piezoelectric element between two contacts surmounted by a seismic mass for amplifying the signal,
  an overmolded peripheral casing to protect the detection assembly, made from a thermoplastic material applied by overmolding at least in part around the body.

It should be noted that, throughout the description, any knock sensor is observed in a position in which the central axis of the mount is vertical and its support ring is toward the lower part. The terms and expressions "lower", "upper", "below", "above", "top", "bottom", etc., are relative to this viewpoint.

In order for the peripheral casing to be able to perform its function of protecting the detection assembly, it is absolutely essential for contact between the casing and the mount to be close contact, and for this to be true at all times. Now, a gap may arise between the mount and the peripheral casing, into which water can infiltrate, leading to potential damage to the detection assembly. This gap is a result on the one hand of the overmolding method which is unable to ensure total adhesion of the casing to the mount and results in the appearance of a manufacturing clearance between the mount and the casing. The aforementioned gap is also the result of the high temperatures to which the knock sensor is subjected in use: an expansion clearance combines, in operation, with the manufacturing clearance because of the differential expansion of the mount, which is made of metal, with respect to the peripheral casing, made of plastic (the two materials present having different thermal expansion coefficients).

In order to limit the risks of water infiltrating between the mount and the peripheral casing, it is known practice to use a mount which, on a peripheral face of the lower support ring, has grooves to accept thermoplastic material so as to improve the attachment of the thermoplastic casing to the metal mount and, as a result, the sealing of the junction between mount and casing.

Nevertheless, the contact between the casing and the connecting mount is not close enough and defective sealing between the overmolded peripheral casing and the metal mount is still observed far too often. The expansion of the metal mount occurs preferentially along an axis perpendicular to a central axis which corresponds to the axis of the central bore.

SUMMARY OF THE INVENTION

An aspect of the invention aims to alleviate these disadvantages by proposing a novel form of mount that makes it possible to obtain a knock sensor with improved sealing.

To this end, an aspect of the invention proposes a knock sensor comprising, in the conventional way, a body comprising a metal mount with a support ring and a detection assembly with piezoelectric element, and a peripheral casing overmolded at least in part around the body. The knock sensor according to an aspect of the invention is characterized in that the mount additionally comprises a flange below the support ring, in which flange attachment holes are formed. These holes increase the attachment of the casing to the mount and encourage adhesion therebetween.

In one preferred embodiment of the invention, the attachment holes are distributed on the flange periodically about the central axis of the mount so that the result obtained in terms of adhesion and resistance to dismantling of the casing and of the mount more or less exhibits symmetry of revolution.

The attachment holes or the mount additionally advantageously have one or more of the following features:
  The mount comprises attachment holes which have a boring axis substantially parallel to the central axis of the mount; as an alternative or in combination, the mount comprises attachment holes the boring axis of which is inclined.
  A section on a vertical (or longitudinal) plane through an attachment hole shows an internal wall chamfered at its lower end. In other words, the attachment hole is cylindrical over an upper portion and widens conically in a downward direction over a lower portion. This feature improves the attachment of the casing to the mount still further.

The mount comprises attachment holes of circular transverse cross section; as an alternative or in combination, the mount comprises attachment holes of oblong cross section. What is meant here by "transverse cross section" is a section on a transverse plane orthogonal to the central axis of the mount (a plane which is horizontal given the viewpoint from which the sensor is being observed).

The flange comprises a peripheral rim extending upward and with the peripheral face of the support ring delimiting a groove into which the attachment holes open. After the manner of the attachment holes, by trapping thermoplastic material, the groove increases the mechanical adhesion of the casing to the mount.

The support ring comprises circular crenellations in its peripheral face, increasing the seepage line for infiltrating water between the lower end of the knock sensor and the detection assembly (the path that water infiltrating into the sensor via its lower end has to follow in order to reach the detection assembly is thus lengthened).

The mount has an upper portion which comprises a plurality of circular grooves. The presence of these grooves increases the seepage line between the upper end of the knock sensor and the detection assembly. Advantageously and according to an aspect of the invention, these grooves have a depth that decreases from the top down (namely from the upper end of the sensor toward the detection assembly). In other words, the thickness of the mount between the central bore and the closed end of each groove increases from one groove to the next, starting from the top down. The reduction is groove depth (or the increase in mount thickness in the region of the grooves) from the upper end of the mount toward the detection element (namely from the top down) makes it possible to compensate for the "elephant-foot" deformation that the mount experiences when the fixing screw is tightened.

The mount is an assembly of two components, a lower component comprising the lower flange and the support ring, and an upper component. The upper component has an external lower shoulder that bears against an internal upper shoulder belonging to the lower component. The two components are kept assembled by the overmolded peripheral casing.

The mount (and more specifically the upper component when the mount is made up of two assembled components) comprises an upper flange which extends radially above the detection assembly. This upper flange increases the seepage line between the upper end of the mount and the detection element.

An aspect of the invention extends to cover a vehicle comprising a knock sensor according to an aspect of the invention. A vehicle is understood to be a motorized two-wheeled, three-wheeled or four-wheeled road vehicle, such as an automotive vehicle for example, or equally well means a vehicle of the aircraft type, such as, for example, a helicopter, or alternately still, a vehicle of the snowmobile type.

BRIEF DESCRIPTION OF THE DRAWINGS

Other features and advantages of aspects of the invention will become apparent from the following description, given with reference to the appended figures that are given by way of non-limiting example and in which identical references are given to similar objects.

DETAILED DESCRIPTION OF THE PREFERRED EMBODIMENTS

Figure 1:
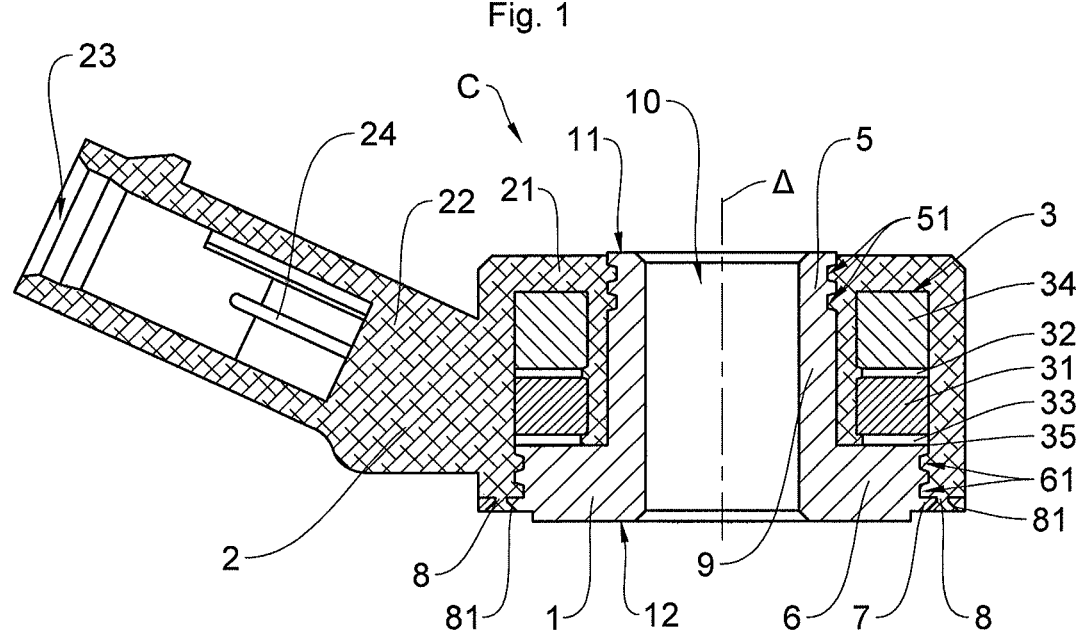
FIG. 1 is a view in axial section of a first embodiment of a knock sensor according to an aspect of the invention.
Figure 2:
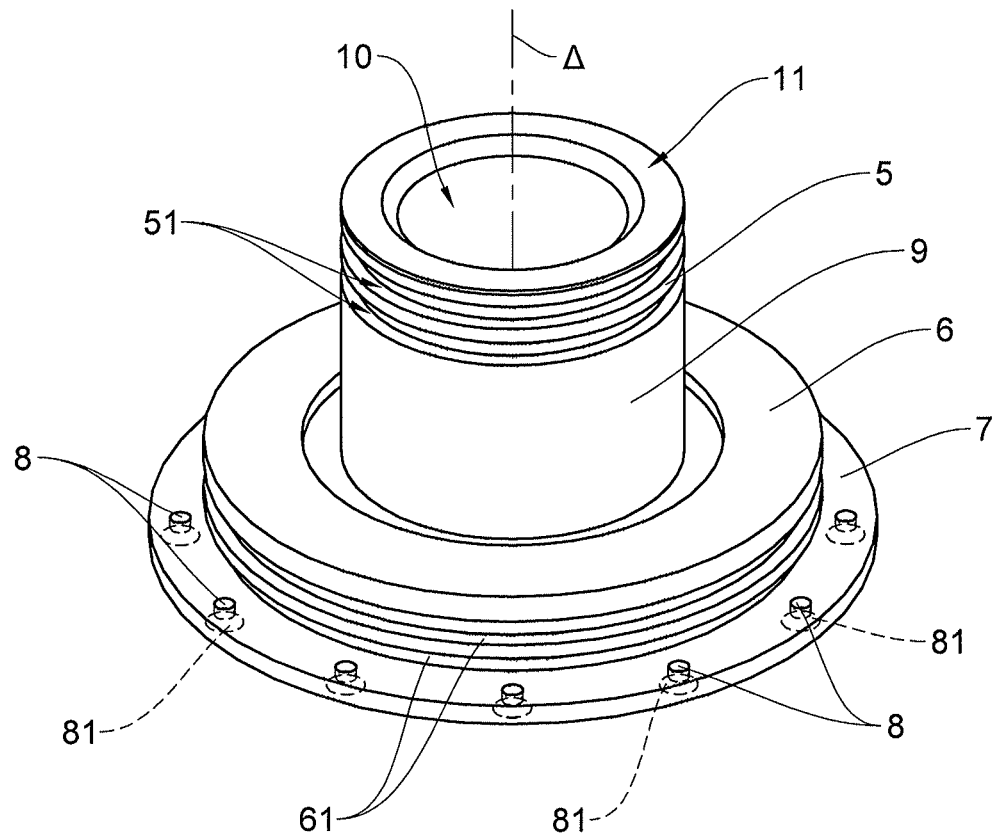
FIG. 2 is a perspective view of the mount of the knock sensor of FIG. 1.

All the knock sensors C illustrated comprise a vibration detection body and a peripheral body-protecting casing 2 made of a thermoplastic material applied by overmolding around said body, at least in part.

The body comprises a metal mount 1 and a detection assembly 3.

The metal mount 1 comprises, from the top down, namely from its upper end 11 to its lower end 12 (the references 11 and 12 also designating the respectively upper and lower ends of the knock sensor C):
- an upper portion 5,
- a central portion 9 extending (radially) opposite the detection assembly 3, the upper portion 5 having a maximum external diameter equal to the maximum external diameter of the central portion 9 and being able to have a minimum external diameter that is smaller if it is provided with circular grooves 51 as it is in the two examples of FIGS. 1 to 5,
- a support ring 6 on which the detection assembly 3 rests, the support ring 6 having a maximum external diameter greater than the maximum external diameter of the central portion 9,
- and, according to an aspect of the invention, a flange 7 bored with attachment holes 8. By definition, the flange 7 extends radially beyond the support ring 6, which means to say that it has an external diameter greater than the maximum external diameter of the support ring 6.

For preference, the attachment holes 8 are distributed periodically about the central axis Δ of the mount. For preference, the mount, considered without the attachment holes, exhibits symmetry of revolution. This is the case in all the examples illustrated.

The mount 1 also comprises a central bore 10 to accept a fixing screw (not depicted) used to anchor the mount—and the knock sensor C—in the engine block.

The detection assembly 3 comprises a plurality of components such as, for example, a piezoelectric element 31, electrical contact elements 32, 33, a seismic mass 34 used to amplify the signal, and insulating elements. Electrical insulation between the detection assembly 3 and metallic mount 1 is afforded by a layer of thermoplastic belonging to the casing 2 between the central portion 9 of the mount and the detection assembly 3, and by an insulating washer 35 between the contact 32 and the support ring 6.

The peripheral casing 2 comprises a portion 21 forming a cap around the mount 1 and a section 22 forming a connection end-piece, the section 22 delimiting a plug socket 23 incorporating an electrical contact 24 and intended to accept a complementary plug for connecting the knock sensor C to a connecting cable (not depicted) connected to a computer of the vehicle (not depicted).

The three embodiments illustrated moreover differ in terms of the following features regarding their mount.

Figure 6:
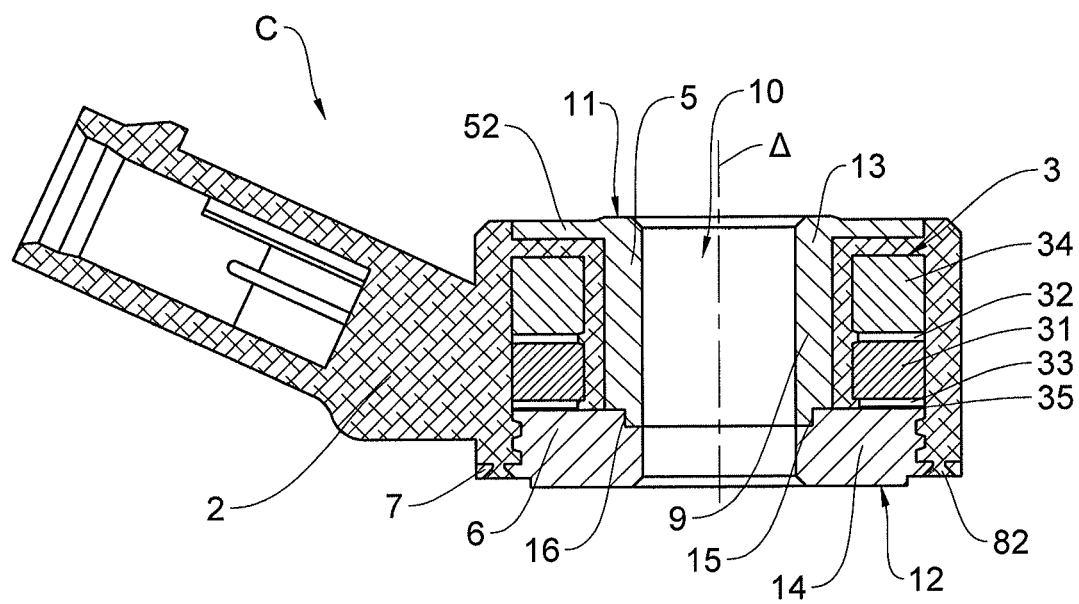
FIG. 6 is a view in axial section of a third embodiment of a knock sensor according to an aspect of the invention.
Figure 7:
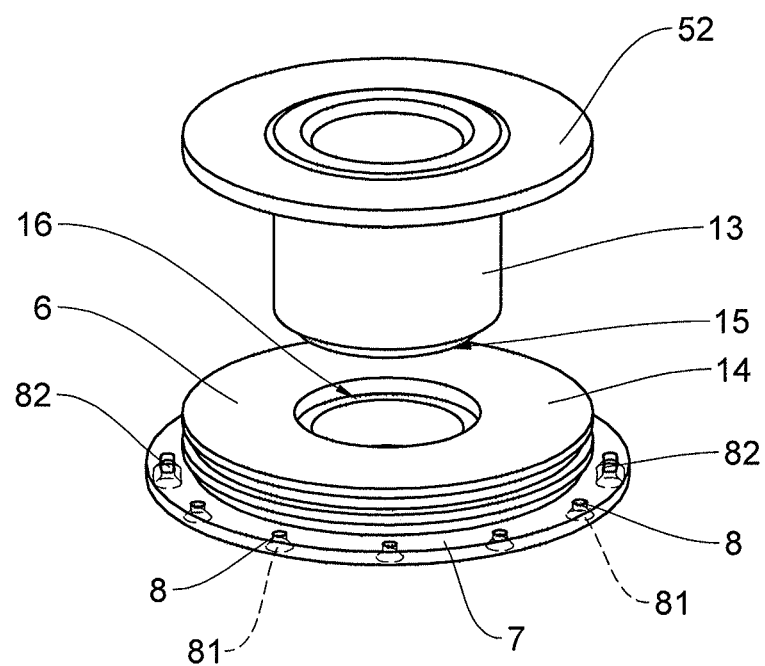
FIG. 7 is a perspective view of the mount of the knock sensor of FIG. 5.

In the first embodiment (FIGS. 1 and 2) and in the third embodiment (FIGS. 6 and 7), the attachment holes 8 of the mount are all identical, with a circular cross section. They exhibit, from the top down, an upper portion of constant cross section then a flared lower section of increasing cross section forming a chamfer 81. As an alternative, the attachment holes (or some of them) may be a constant cross section over their entire height, which means to say may be fully cylindrical.

Figure 3:
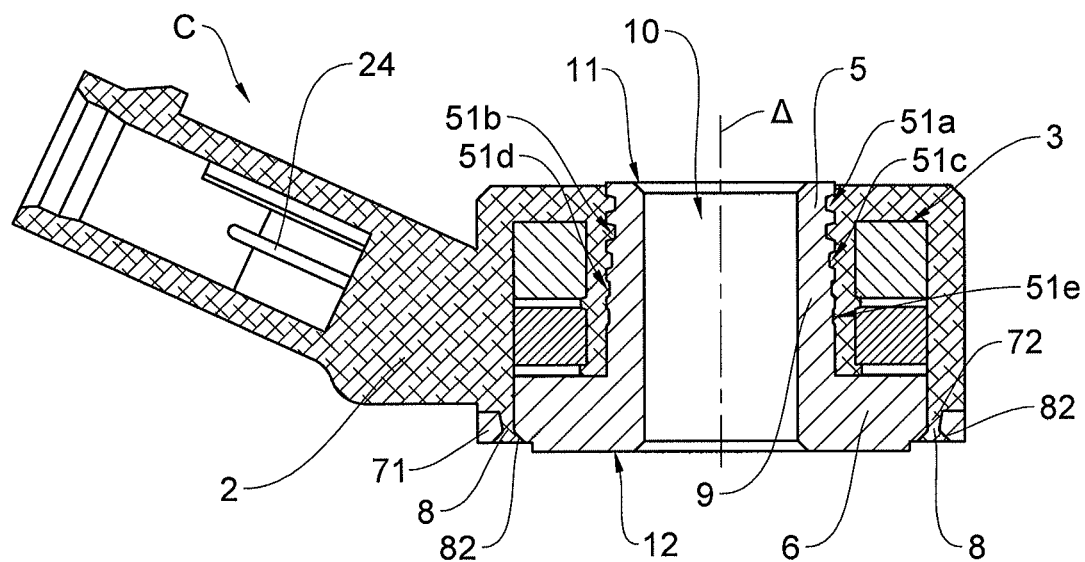
FIG. 3 is a view in axial section of a second embodiment of a knock sensor according to an aspect of the invention.
Figure 4:
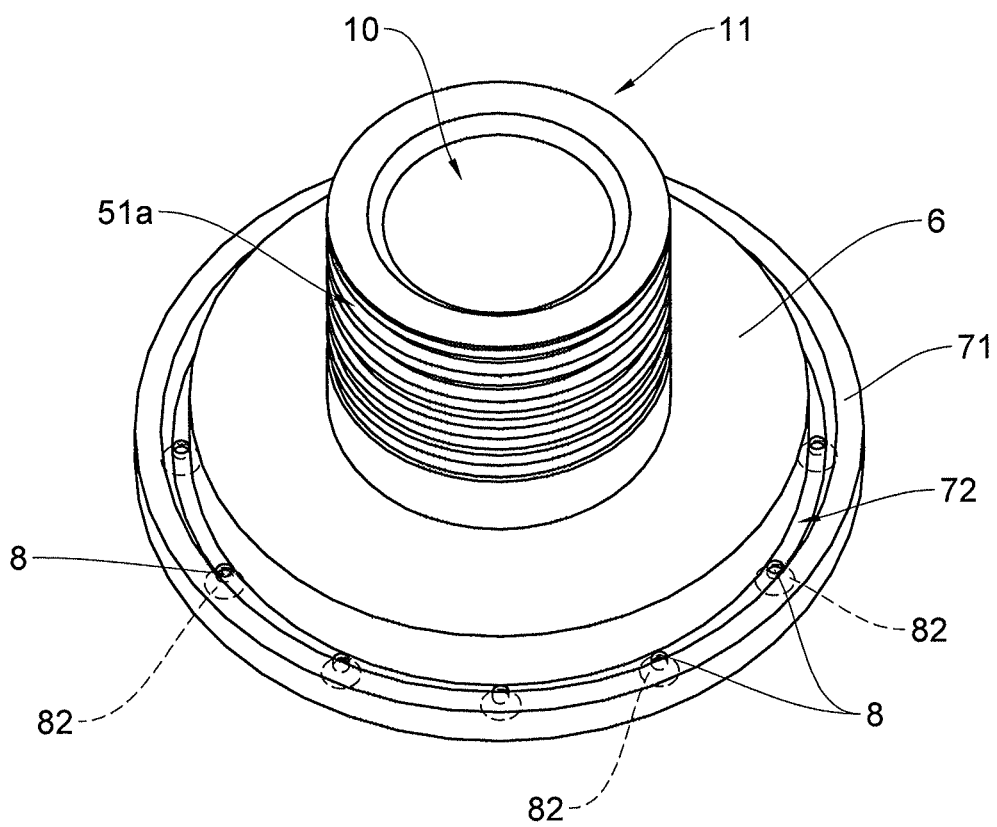
FIG. 4 is a perspective view of the mount of the knock sensor of FIG. 3.

In the second embodiment (FIGS. 3 to 5), the mount comprises circular attachment holes 8 identical to those of the first and third embodiments and two diametrically opposed oblong attachment holes 82 (not visible in FIG. 4). The oblong holes may be fully cylindrical or may have a lower chamfer like the circular holes previously described.

The lower flange 7 of the second embodiment (FIGS. 3 and 4) additionally comprises a rim 71 which extends axially upward and therefore, with the support ring 6, delimits a groove 72. The groove 72 plays a part in trapping thermoplastic material in order to strengthen the assembly between mount and casing.

Figure 5:
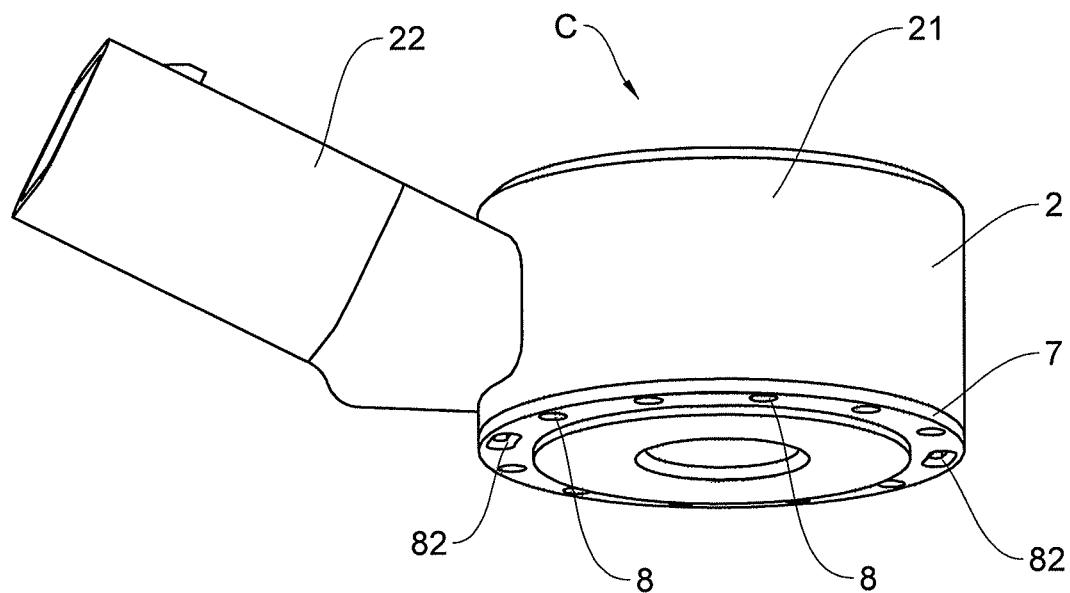
FIG. 5 is a perspective view of the knock sensor of FIGS. 3 and 4 (with the mount and casing assembled).

The support ring 6 of the first embodiment has crenellations 61 extending around its entire periphery (and this is why such crenellations were qualified as circular crenellations earlier). In the example illustrated, these crenellations have a cross section (taken on any axial plane containing the central axis Δ of the mount) that is trapezoidal, but this cross section could have a different shape, being for example square or dovetailed. These crenellations increase the seepage line between the lower end 12 of the mount and the detection assembly 3. The third embodiment (FIGS. 6 and 7) is likewise provided with circular crenellations at its support ring, which is not the case in the second embodiment (FIGS. 3 to 5).

The upper portion 5 of the first embodiment (FIGS. 1 and 2) has grooves 51 extending around its entire periphery and referred to as upper grooves in the overall description above. In the example illustrated, these upper groups 51 have a cross section (taken on any axial plane) that is square, but this cross section could have a different shape, being for example trapezoidal or dovetailed. These upper grooves 51 increase the seepage line between the upper end 11 of the mount and the detection assembly 3. The second embodiment (FIGS. 3 to 5) is likewise provided with upper grooves on its upper portion 5. It also has upper grooves on an upper part of its central portion 9, notably facing the seismic mass 34, which is not the case with the central portion of the first embodiment, which is fully cylindrical. The upper grooves 51 of the first embodiment (FIGS. 1 and 2) has a depth that is (radially) constant, whereas the upper grooves 51a, 51b, 51c, 51d, 51e, etc. of the second embodiment have a depth that decreases from the top down, with a maximum external diameter that remains constant, which means to say that the groove 51d "starts" from the same external cylinder but is not as deep as the groove 51a (which means that the bottoms of the two grooves are not inscribed in the same cylinder). In other words, the thickness of material of the upper and central portions of the mount in the region of the grooves increases from the top down, from one groove to the next. This increase in thickness compensates for the deformation (with greater crushing of the thickness of the mount in the bottom part of the central portion 9) that the mount experiences when the knock sensor C is mounted in the engine block.

The mount of the third embodiment (FIGS. 6 and 7) is made up of two components 13, 14, whereas the mount of the first and second embodiments is made as a single component. The component 13 comprises the upper portion 5 and the central portion 9 of the mount, whereas the component 14 comprises the support ring 6 and the lower flange 7. Where the two components meet, an external shoulder 15 of the component 13 rests on an internal shoulder 16 of the component 14. The two-part design of the mount offers various advantages. It makes it possible to provide an upper flange 52 which significantly increases the seepage line between the upper end 11 and the detection assembly 3 and contributes to the strength of the mount/casing assembly: the casing is clamped between the upper flange 52 and the support ring 6 extended by the lower flange 7, while at the same time holding together the components 13 and 14 that it encapsulates. Creating an upper flange in a one-part mount such as that of the first embodiment is also possible, but less advantageous (if the mount is produced by machining) because it necessitates starting from an unfinished component of larger external diameter and leads to a significant wastage of material. Creating a two-part mount as illustrated is particularly simple and inexpensive.

The features of the various embodiments illustrated may be combined. For example, upper circular grooves may be formed in the component 13 just below the upper flange 52 of the third embodiment. A groove 72 may be provided in the first embodiment. Other combinations and other alternate forms are possible, provided that they still fall within the scope delimited by the attached claims. By way of example, the detection assembly is not limited to the one illustrated; the attachment holes may have diverse and varying cross sections and the axis along which they are bored may be inclined (which is to say not parallel to the central axis Δ); etc.

Thus, the attachment holes according to an aspect of the invention allow better attachment of the casing material around the mount and considerably reduce the effects of the expansion of the mount along the axis perpendicular to the central axis.

The chamfered wall of the attachment holes, the peripheral rim, the groove, the circular crenellations and the circular grooves make it possible to improve the sealing of the knock sensor still further.

The invention claimed is:

1. A knock sensor comprising:
    a body comprising:
    a detection assembly able to measure vibrations,
    a metal mount having a support ring on which the detection assembly rests,
    a peripheral casing to protect the detection assembly, made from a thermoplastic material applied by overmolding at least in part around the body,
    wherein the mount comprises a lower flange below the support ring and the lower flange is bored with attachment holes.

2. The knock sensor as claimed in claim 1, wherein the attachment holes are distributed on the lower flange periodically about a central axis of the mount.

3. The knock sensor as claimed in claim 2, wherein at least one of the attachment holes has a boring axis substantially parallel to a central axis of the mount.

4. The knock sensor as claimed in claim 1, wherein at least one of the attachment holes has a boring axis substantially parallel to a central axis of the mount.

5. The knock sensor as claimed in claim 1, wherein at least one of the attachment holes has an internal wall that is chamfered at a lower end.

6. The knock sensor as claimed in claim 1, wherein the support ring comprises circular crenellations in a peripheral face.

7. The knock sensor as claimed in claim 1, wherein the mount is an assembly of two components, with a lower component comprising the lower flange and the support ring, and an upper component, the two components being kept assembled by the peripheral casing.

8. The knock sensor as claimed in claim 7, wherein the upper component has an external lower shoulder that bears against an internal upper shoulder belonging to the lower component.

9. The knock sensor as claimed in claim 1, wherein the mount comprises an upper flange which extends radially above the detection assembly.

10. A vehicle comprising a knock sensor as claimed in claim 1.

11. A knock sensor comprising:
a body comprising:
a detection assembly able to measure vibrations,
a metal mount having a support ring on which the detection assembly rests, and
a peripheral casing to protect the detection assembly, made from a thermoplastic material applied by overmolding at least in part around the body,
wherein the mount comprises a lower flange below the support ring and the lower flange is bored with attachment holes, and
wherein the lower flange comprises a peripheral rim extending upward and with a peripheral face of the support ring delimiting a groove into which the attachment holes open.

12. A knock sensor comprising:
a body comprising:
a detection assembly able to measure vibrations,
a metal mount having a support ring on which the detection assembly rests, and
a peripheral casing to protect the detection assembly, made from a thermoplastic material applied by overmolding at least in part around the body,
wherein the mount comprises a lower flange below the support ring and the lower flange is bored with attachment holes, and
wherein the mount has an upper portion which comprises a plurality of circular grooves, and these circular grooves have a depth that decreases from one groove to the next, from the top down.

* * * * *